(12) United States Patent
Hayashi et al.

(10) Patent No.: US 9,849,768 B2
(45) Date of Patent: Dec. 26, 2017

(54) VEHICLE BODY STRUCTURE

(71) Applicants: Tsuyoshi Hayashi, Miyoshi (JP); Atsushi Yamanaka, Okazaki (JP)

(72) Inventors: Tsuyoshi Hayashi, Miyoshi (JP); Atsushi Yamanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/766,934

(22) PCT Filed: Feb. 20, 2013

(86) PCT No.: PCT/JP2013/054232
§ 371 (c)(1),
(2) Date: Aug. 10, 2015

(87) PCT Pub. No.: WO2014/128869
PCT Pub. Date: Aug. 28, 2014

(65) Prior Publication Data
US 2015/0367718 A1 Dec. 24, 2015

(51) Int. Cl.
*B60K 1/04* (2006.01)
*B62D 25/20* (2006.01)
(Continued)

(52) U.S. Cl.
CPC .............. *B60K 1/04* (2013.01); *B60L 3/0007* (2013.01); *B60L 3/0046* (2013.01);
(Continued)

(58) Field of Classification Search
CPC .. B60K 1/04; B60K 11/06; B60K 2001/0438; B60K 2001/005; B60R 16/04;
(Continued)

(56) References Cited

U.S. PATENT DOCUMENTS

| 5,501,289 A * | 3/1996 | Nishikawa | ............... | B60K 1/04 180/65.1 |
| 6,260,652 B1 * | 7/2001 | Steenackers | ........... | B60K 13/04 180/296 |

(Continued)

FOREIGN PATENT DOCUMENTS

| FR | 2479751 A1 * | 10/1981 | ............... B60K 1/04 |
| JP | H06-344953 A | 12/1994 | |

(Continued)

*Primary Examiner* — James A Shriver, II
*Assistant Examiner* — Steve Clemmons
(74) *Attorney, Agent, or Firm* — Oliff PLC

(57) ABSTRACT

A vehicle body structure 100 according to an embodiment of the present invention includes a first cross member 1, a second cross member 2, and a third cross member 3 forming part of a framework of a vehicle and extending in a vehicle width direction. Further, the vehicle body structure 100 accommodates at least part of a battery portion 10a of a power storage device 10 in a space SP1R between a floor in a passenger compartment and a floor panel 4 and between the first cross member 1 and the second cross member 2. Further, the vehicle body structure 100 accommodates at least part of a controlling portion 10c of the power storage device 10 in a space SP2R between the first cross member 1 and the third cross member 3.

8 Claims, 6 Drawing Sheets

(51) Int. Cl.
 B60L 3/00 (2006.01)
 B60L 11/00 (2006.01)
 B60L 11/18 (2006.01)
 B60R 16/04 (2006.01)
 B60K 11/06 (2006.01)
 B60K 1/00 (2006.01)

(52) U.S. Cl.
 CPC ......... B60L 11/005 (2013.01); B60L 11/1857 (2013.01); B60L 11/1864 (2013.01); B60L 11/1874 (2013.01); B60L 11/1877 (2013.01); B60L 11/1879 (2013.01); B60R 16/04 (2013.01); B62D 25/20 (2013.01); B60K 11/06 (2013.01); *B60K 2001/005* (2013.01); *B60K 2001/0438* (2013.01); *B60L 2240/545* (2013.01); *B60L 2240/662* (2013.01); *Y02T 10/7005* (2013.01); *Y02T 10/7022* (2013.01); *Y02T 10/7061* (2013.01); *Y02T 10/7291* (2013.01); *Y02T 90/16* (2013.01)

(58) Field of Classification Search
 CPC .. B62D 25/20; B60L 11/1877; B60L 11/1879; H01M 2/1083; H01H 27/00; H01H 27/04
 See application file for complete search history.

(56) References Cited

U.S. PATENT DOCUMENTS

| | | | | |
|---|---|---|---|---|
| 6,315,069 | B1 * | 11/2001 | Suba | B60K 1/04 180/68.5 |
| 6,547,020 | B2 * | 4/2003 | Maus | B60K 1/04 180/68.5 |
| 7,051,825 | B2 * | 5/2006 | Masui | B60K 1/04 180/65.1 |
| 7,427,093 | B2 * | 9/2008 | Watanabe | B60K 1/04 296/37.15 |
| 7,631,711 | B2 * | 12/2009 | Kubo | B60K 1/04 180/65.1 |
| 7,997,368 | B2 * | 8/2011 | Takasaki | B60K 1/04 180/68.5 |
| 8,288,024 | B2 * | 10/2012 | Hayashi | H01M 2/1072 429/1 |
| 8,397,853 | B2 * | 3/2013 | Stefani | B62D 25/20 180/65.31 |
| 8,469,129 | B2 * | 6/2013 | Mildner | B60K 1/04 180/68.5 |
| 8,561,743 | B2 * | 10/2013 | Iwasa | B60K 1/04 180/68.5 |
| 8,672,354 | B2 * | 3/2014 | Kim | B60K 1/04 180/68.5 |
| 8,839,895 | B2 * | 9/2014 | Kato | B60K 1/04 180/68.5 |
| 8,893,839 | B2 * | 11/2014 | Saeki | B60L 11/1874 180/68.5 |
| 8,932,769 | B2 * | 1/2015 | Ohashi | B62D 25/20 180/65.31 |
| 8,939,246 | B2 * | 1/2015 | Yamaguchi | B60K 1/04 180/311 |
| 8,960,350 | B2 * | 2/2015 | Kosaki | B60K 1/04 180/65.22 |
| 8,967,312 | B2 * | 3/2015 | Yanagi | B60K 1/04 180/68.5 |
| 8,980,458 | B2 * | 3/2015 | Honjo | B60K 1/04 429/100 |
| 9,022,152 | B2 * | 5/2015 | Imamura | B62D 21/157 180/68.5 |
| 9,073,426 | B2 * | 7/2015 | Tachikawa | B60K 1/04 |
| 9,096,117 | B2 * | 8/2015 | Matsuda | B60K 6/40 |
| 9,108,497 | B2 * | 8/2015 | Harrison, III | B60K 1/04 |
| 2004/0235315 | A1 | 11/2004 | Masui et al. | |
| 2009/0197456 | A1 | 8/2009 | Kawai et al. | |
| 2012/0018238 | A1 * | 1/2012 | Mizoguchi | B60K 1/04 180/68.5 |
| 2012/0021301 | A1 * | 1/2012 | Ohashi | B60K 1/04 429/400 |
| 2014/0021744 | A1 | 1/2014 | Imamura et al. | |
| 2014/0315064 | A1 * | 10/2014 | Katayama | B60K 1/04 429/120 |
| 2014/0374180 | A1 * | 12/2014 | Katayama | B60K 1/04 180/68.5 |

FOREIGN PATENT DOCUMENTS

| | | | |
|---|---|---|---|
| JP | 2000-238541 A | | 9/2000 |
| JP | 2004-345448 A | | 12/2004 |
| JP | 2005-306133 A | | 11/2005 |
| JP | 2009-083601 A | | 4/2009 |
| JP | 2009087646 A | * | 4/2009 |
| JP | 2009-181895 A | | 8/2009 |
| JP | 2011-057191 A | | 3/2011 |
| JP | 2012028059 A | * | 2/2012 |
| WO | 2012/086297 A1 | | 6/2012 |
| WO | WO 2013093276 A1 | * | 6/2013 ............... B60K 1/04 |

* cited by examiner

VEHICLE BODY STRUCTURE

TECHNICAL FIELD

The present invention relates to a vehicle body structure, and particularly, to a vehicle body structure in which a power storage device can be provided.

BACKGROUND ART

A vehicle body structure having a space in which a battery can be accommodated right under a front seat has been conventionally known (see Patent Document 1, for example).

CITATION LIST

Patent Documents

Patent Document 1: Japanese Patent Application Publication No. 2005-306133 (JP 2005-306133 A)

SUMMARY OF THE INVENTION

Problem to be Solved by the Invention

However, the vehicle body structure of Patent Document 1 accommodates a battery right under a cross member. Because of this, a space in which to accommodate the battery and a floor provided above the space are high just by a thickness of the cross member.

In view of the above problem, an object of the present invention is to provide a vehicle body structure which can accommodate a power storage device therein and which can restrain an increase in floor height.

Means for Solving the Problem

In order to achieve the above object, a vehicle body structure according to an embodiment of the present invention is a vehicle body structure including a first frame member and a second frame member forming part of a framework of a vehicle and extending in a vehicle width direction, wherein a power storage device includes a battery portion and a controlling portion, and at least part of the battery portion is accommodated in a space between a floor in a passenger compartment and a floor panel and between the first frame member and the second frame member.

Advantageous Effects of Invention

According to the abovementioned means, the present invention can provide a vehicle body structure which can accommodate a power storage device therein and which can restrain an increase in floor height.

MODES FOR CARRYING OUT THE INVENTION

Figure 1:
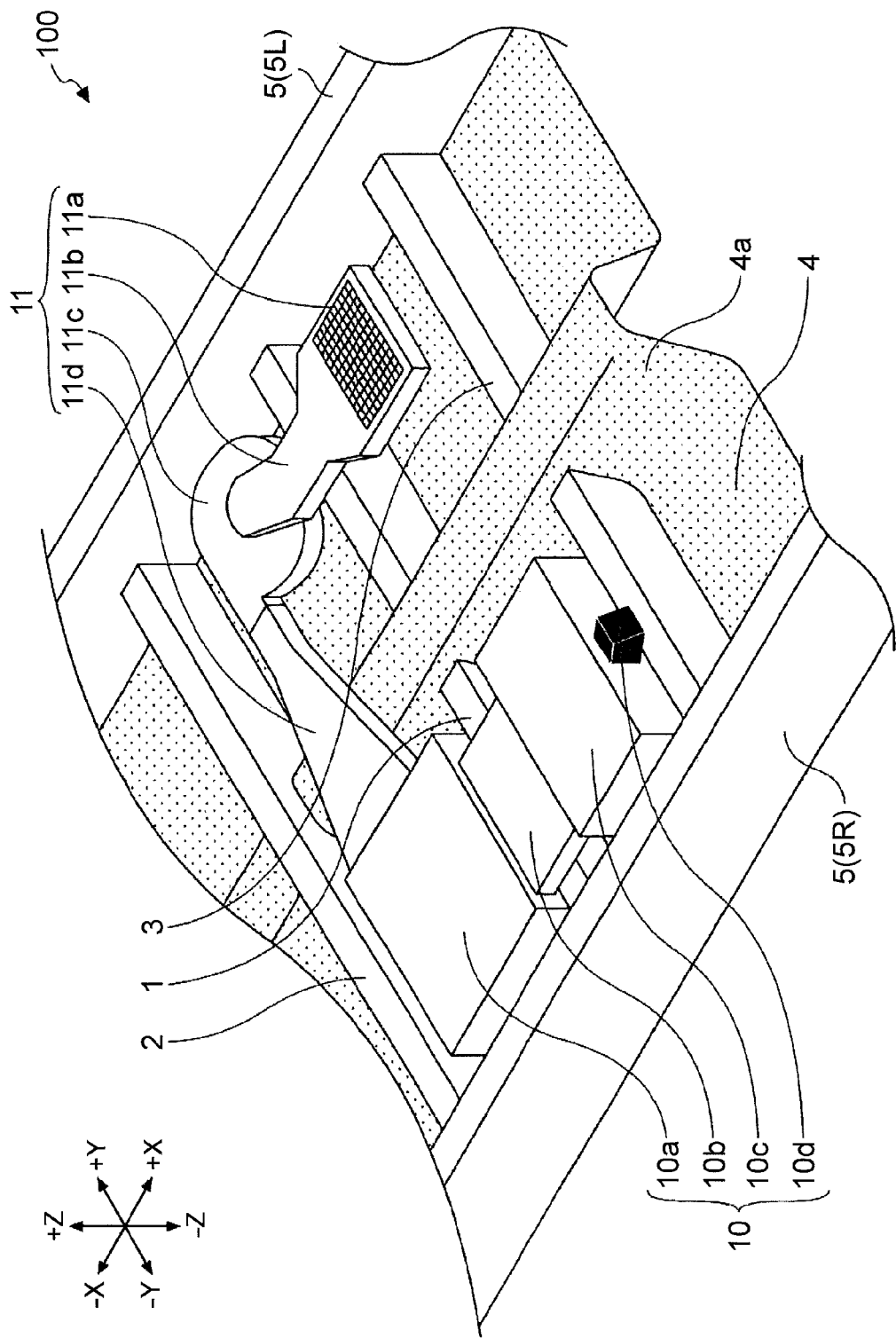
FIG. 1 is a perspective view of an essential part of a vehicle body structure according to an embodiment of the present invention, when viewed from a diagonally upper side.
Figure 2:
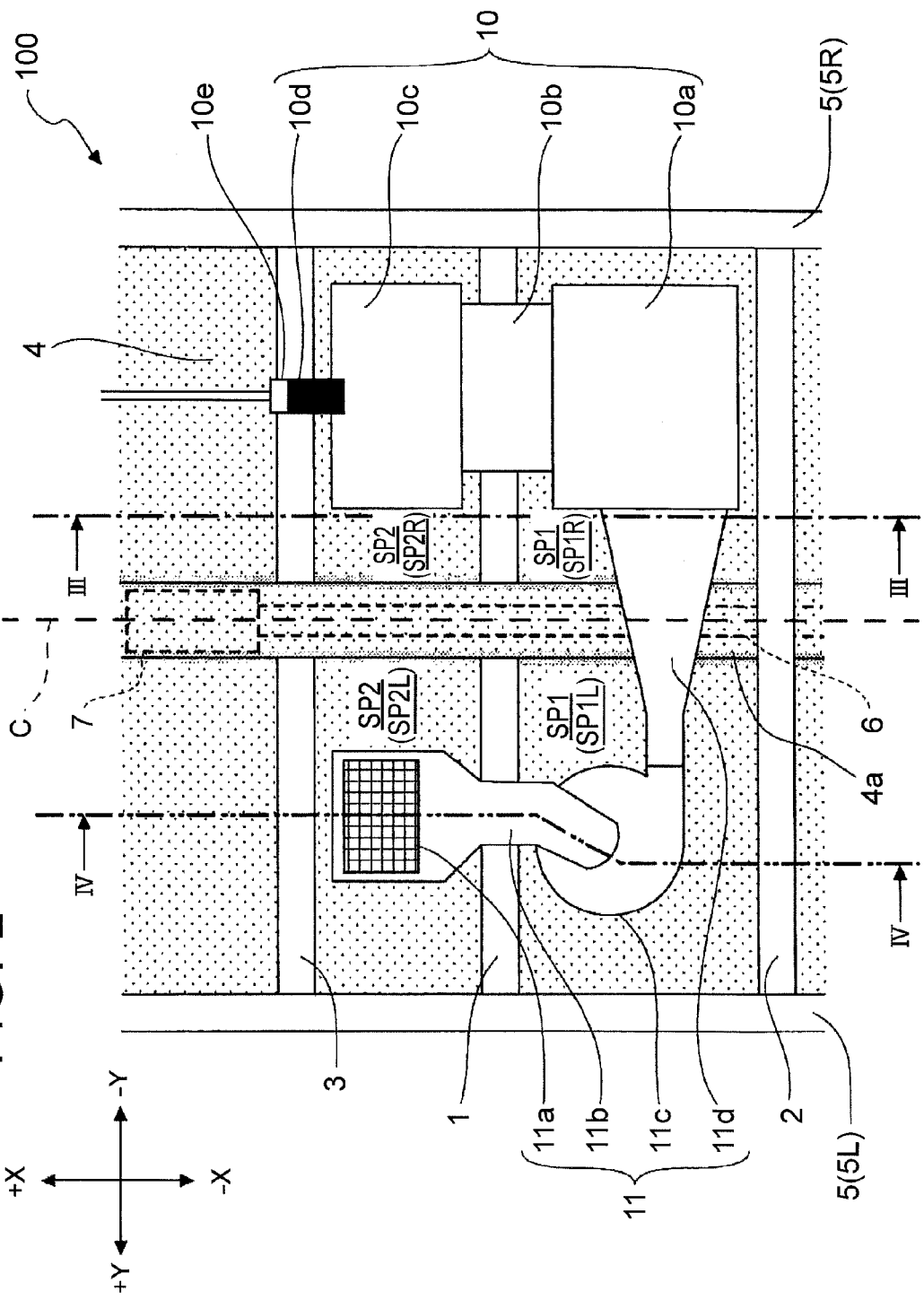
FIG. 2 is a top view of the essential part of the vehicle body structure of FIG. 1, when viewed from an upper side.

FIGS. 1 and 2 are views each illustrating an exemplary configuration of an essential part of a vehicle body structure 100 according to an embodiment of the present invention. More specifically, FIG. 1 is a perspective view of the essential part of the vehicle body structure 100 when viewed from a diagonally upper side, and FIG. 2 is a top view of the essential part of the vehicle body structure 100 when viewed from an upper side. Note that, in FIGS. 1 and 2, an X-axis direction corresponds to a vehicle front-rear direction, a Y-axis direction corresponds to a vehicle width direction, and a Z-axis direction corresponds to a vertical direction. Further, a +X direction corresponds to a vehicle front direction, a −X direction corresponds to a vehicle rear direction, a +Y-axis direction corresponds to a vehicle left direction, and a −Y-axis direction corresponds to a vehicle right direction.

As illustrated in FIGS. 1 and 2, the vehicle body structure 100 mainly includes a first cross member 1, a second cross member 2, a third cross member 3, a floor panel 4, and a longitudinal frame member 5. In the present embodiment, the vehicle body structure 100 is provided in a hybrid vehicle, an electric vehicle, and the like including a power storage device 10 for storing electrical energy to be use for running.

The first cross member 1, the second cross member 2, and the third cross member 3 are transverse frame members forming part of a framework of a vehicle and extending in the vehicle width direction, and are placed at an interval in the vehicle front-rear direction. Further, the first cross member 1, the second cross member 2, and the third cross member 3 are placed between a left rocker panel 5L and a right rocker panel 5R, which are the longitudinal frame member 5, and both ends thereof are fixed to the left rocker panel 5L and the right rocker panel 5R by welding or the like. Note that the first cross member 1 is placed on a front side relative to the second cross member 2 in the vehicle front-rear direction, and the third cross member 3 is placed on a front side relative to the first cross member 1 in the vehicle front-rear direction.

The floor panel 4 is a plate-shaped member constituting a bottom part of a vehicle body, and separates a passenger-compartment outer space from a vehicle outer space. Note that the passenger-compartment outer space is part of a vehicle internal space, and is separated from a passenger-compartment internal space by a floorboard or a floor carpet (not shown). Further, the floor panel 4 includes a swelling portion 4a. In the present embodiment, the floor panel 4 includes the swelling portion 4a extending in the vehicle front-rear direction along a vehicle central axis C as indicated by a broken line of FIG. 2. The swelling portion 4a is a structure to form a floor tunnel in the vehicle outer space under the floor panel 4. An exhaust pipe 6, a catalytic converter 7, a silencer (not shown), and the like are accommodated in the floor tunnel.

The longitudinal frame member 5 is a frame member forming part of the framework of the vehicle and extending in the vehicle front-rear direction. In the present embodiment, the longitudinal frame member 5 includes the left rocker panel 5L and the right rocker panel 5R constituting side parts of the vehicle body. Note that the longitudinal frame member 5 may be a side sill.

With such a configuration, the vehicle body structure 100 forms a space SP1 partitioned by the first cross member 1, the second cross member 2, the floor panel 4, the left rocker panel 5L, and the right rocker panel 5R. Further, the vehicle body structure 100 forms a space SP2 partitioned by the first cross member 1, the third cross member 3, the floor panel 4, the left rocker panel 5L, and the right rocker panel 5R. Further, the space SP1 is divided into a space SP1L on a left side in the vehicle width direction and a space SP1R on a right side in the vehicle width direction by the swelling portion 4a of the floor panel 4. Similarly, the space SP2 is divided into a space SP2L on the left side in the vehicle width direction and a space SP2R on the right side in the vehicle width direction by the swelling portion 4a of the floor panel 4. Note that the space SP1 and the space SP2 are partially or generally covered with one or a plurality of plate materials such as a floorboard (not shown), and a floor carpet is laid on those plate materials. On that account, the space SP1 and the space SP2 each form part of the passenger-compartment outer space, which is the vehicle internal space.

Further, the vehicle body structure 100 is configured such that a power storage device 10, a cooling device 11, and the like are accommodated in spaces partitioned by the first cross member 1, the second cross member 2, the third cross member 3, and the floor panel 4.

The power storage device 10 is a device for storing electrical energy therein, and includes, for example, storage batteries such as a nickel hydrogen battery and a lithium-ion batteries and a capacitor such as an electric double layer capacitor. In the present embodiment, the power storage device 10 is a battery pack including a nickel hydrogen battery, and is mainly constituted by a battery portion 10a, a connection portion 10b, a controlling portion 10c, and a high-voltage blocking portion 10d.

Figure 3:
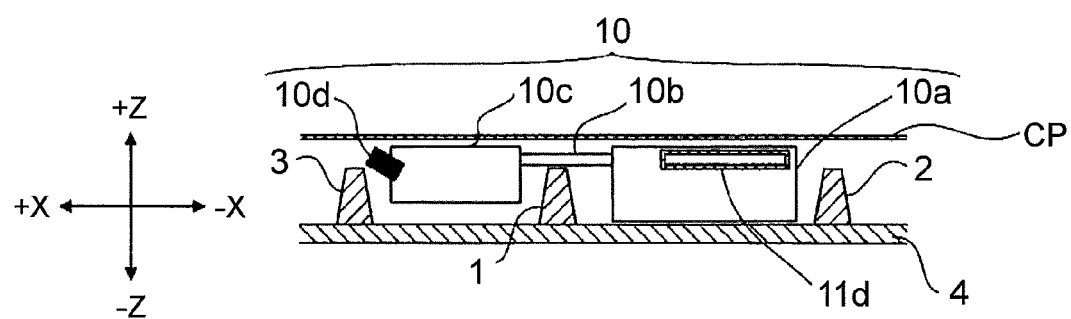
FIG. 3 is a partial sectional view of a vertical plane indicated by an alternate long and short dash line in FIG. 2, when viewed from a direction of an arrow III.

Here, with reference to FIG. 3, details of the power storage device 10 are described. Note that FIG. 3 is a partial sectional view of a vertical plane indicated by an alternate long and short dash line in FIG. 2, when viewed from a direction of an arrow III. Further, FIG. 3 illustrates a state where the space SP1 and the space SP2 are covered with a floor carpet CP.

The battery portion 10a is a portion including a plurality of battery stacks. In the present embodiment, the battery portion 10a includes a battery pack case in which to accommodate battery stacks for 20 modules.

The connection portion 10b is a portion for connecting the battery portion 10a to the controlling portion 10c. In the present embodiment, the connection portion 10b includes a structure for structurally connecting the battery pack case of the battery portion 10a to a case of the controlling portion 10c, and a wire harness for electrically connecting the battery portion 10a to the controlling portion 10c. Further, as illustrated in FIGS. 2 and 3, the connection portion 10b is placed between the first cross member 1 and the floor carpet CP so as to be provided over the first cross member 1.

The controlling portion 10c is a portion for controlling a storage stage of the battery portion 10a. In the present embodiment, the controlling portion 10c includes functional elements such as a junction block, a system main relay, and a monitoring unit, and a case in which to accommodate those functional elements.

The high-voltage blocking portion 10d is a portion that constitutes a manually blocking device for blocking a high voltage of the battery portion 10a. In the present embodiment, the high-voltage blocking portion 10d is placed on the case of the controlling portion 10c so that a service plug 10e can be inserted and pulled above the third cross member 3. By placing the high-voltage blocking portion 10d on a rigid cross member, the high-voltage blocking portion 10d is hard to be deformed or damaged even at the time of a vehicle collision. This arrangement can restrain or prevent occurrence of such a state where the service plug 10e cannot be pull out. Further, an operator such as a technician can easily pull out the service plug 10e at the time of operation such as inspection, thereby making it possible to block a high voltage immediately.

The cooling device 11 is a device for cooling down the power storage device 10. In the present embodiment, the cooling device 11 is mainly constituted by an intake portion 11a, a first duct portion 11b, a blower portion 11c, and a second duct portion 11d.

Figure 4:
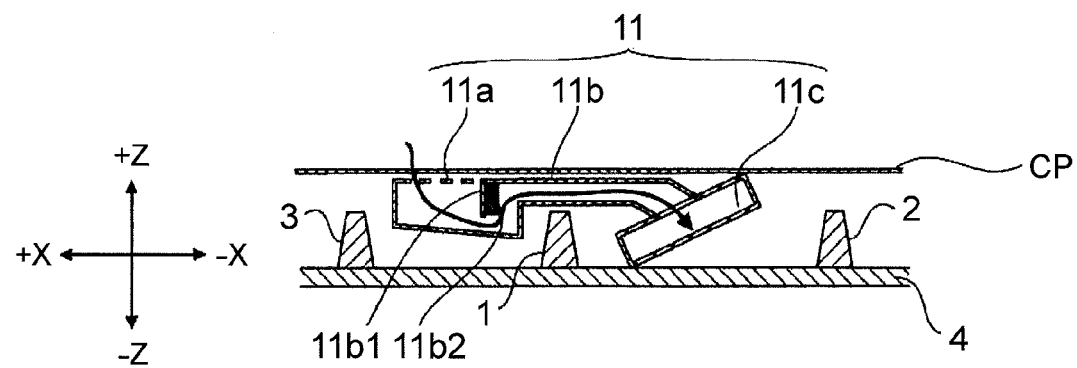
FIG. 4 is a partial sectional view of a vertical plane indicated by an alternate long and two short dashes line in FIG. 2, when viewed from a direction of an arrow IV.

Here, with reference to FIG. 4, details of the cooling device 11 are described. Note that FIG. 4 is a partial sectional view of a vertical plane indicated by an alternate long and two short dashes line in FIG. 2, when viewed from a direction of an arrow IV. Further, FIG. 4 illustrates a state where the space SP1 and the space SP2 are covered with the floor carpet CP.

The intake portion 11a is a portion including an opening for taking air into the cooling device 11 from the passenger-compartment internal space above the floor carpet CP. In the present embodiment, the intake portion 11a is placed on a front side relative to the blower portion 11c, and is provided right under a front end of a front seat (not shown). Note that an arrow indicated by a continuous line in FIG. 4 indicates a state where the air taken in from the intake portion 11a reaches the blower portion 11c.

The first duct portion 11b is a duct for connecting the intake portion 11a to the blower portion 11c. In the present embodiment, a partition wall 11b1 is provided at a position adjacent to the intake portion 11a in the first duct portion 11b, and a sound absorbing material 11b2 is accommodated on a downstream side of the partition wall 11b1. Further, as illustrated in FIGS. 2 and 4, the first duct portion 11b is placed between the first cross member 1 and the floor carpet CP so as to be provided over the first cross member 1.

The blower portion 11c is a blower for sending air taken in from one side toward the other side. In the present embodiment, in order to cool down the power storage device 10, the blower portion 11c sends the air taken in through the intake portion 11a and the first duct portion 11b to the power storage device 10 via the second duct portion 11d. Note that, in the present embodiment, the blower portion 11c is accommodated in the space SP1L in an inclined manner. This is because a height of a space in which to accommodate the cooling device 11 is lowered. However, the present invention is not limited to this configuration. The blower portion 11c can be accommodated with any posture in consideration of a passage resistance of the first duct portion 11b, a tolerance height of an accommodation space, and the like.

The second duct portion 11d is a duct for connecting the blower portion 11c to the battery portion 10a of the power storage device 10. In the present embodiment, as illustrated in FIGS. 1 and 2, the second duct portion 11*d* is placed between the floor carpet CP and the swelling portion 4*a* so as to be provided over the swelling portion 4*a* of the floor panel 4. Further, the second duct portion 11*d* is configured so that that part of the second duct portion 11*d* which is provided over the swelling portion 4*a* has a thin thickness. On this account, the second duct portion 11*d* does not limit the height of the swelling portion 4*a* excessively, and does not cause an adverse effect on the rigidity of the vehicle body structure 100.

With the above configuration, the cooling device 11 can cool down the power storage device 10 by blowing, to the power storage device 10, the air which is taken in from the passenger-compartment internal space above the floor carpet CP and which has a relatively low temperature. More specifically, the cooling device 11 can cool down the battery portion 10*a* by supplying the air to the battery portion 10*a* so that the air is supplied from a top face of the battery portion 10*a* toward a bottom face thereof so as to preferably pass through respective parts between the plurality of battery stacks.

Next will be described how to accommodate the power storage device 10 and the cooling device 11 in the space formed by the vehicle body structure 100.

The vehicle body structure 100 accommodates the power storage device 10 on one side across that swelling portion 4*a* of the floor panel 4 which extends in the vehicle front-rear direction, and accommodates the cooling device 11 on the other side. In the present embodiment, the vehicle body structure 100 accommodates the power storage device 10 in the space SP1R and the space SP2R on the right side relative to the swelling portion 4*a*, and accommodates the cooling device 11 in the space SP1L and the space SP2L on the left side relative to the swelling portion 4*a*. Note that the vehicle body structure 100 may accommodate the power storage device 10 in the space SP and the space SP2L on the left side relative to the swelling portion 4*a*, and may accommodate the cooling device 11 in the space SP1R and the space SP2R on the right side relative to the swelling portion 4*a*.

Further, the vehicle body structure 100 accommodates a part of the power storage device 10 on one side across the first cross member 1 extending in the vehicle width direction, and accommodates another part of the power storage device 10 on the other side. In the present embodiment, the vehicle body structure 100 accommodates the battery portion 10*a* in the space SP1R placed on a rear side relative to the first cross member 1 and accommodates the controlling portion 10*c* in the space SP2R placed on a front side relative to the first cross member 1, within a space on the right side relative to the swelling portion 4*a*. Note that the vehicle body structure 100 may accommodate the battery portion 10*a* in the space SP2R placed on the front side relative to the first cross member 1 and accommodate the controlling portion 10*c* in the space SP1R placed on the front side relative to the first cross member 1, within the space on the right side relative to the swelling portion 4*a*.

Further, the vehicle body structure 100 accommodates a part of the cooling device 11 on one side across the first cross member 1 extending in the vehicle width direction, and accommodates another part of the cooling device 11 on the other side. In the present embodiment, the vehicle body structure 100 accommodates the blower portion 11*c* in the space SP1L placed on the rear side relative to the first cross member 1 and accommodates the intake portion 11*a* in the space SP2L placed on the front side relative to the first cross member 1, within a space on the left side relative to the swelling portion 4*a*. This is because the battery portion 10*a* of the power storage device 10 and the blower portion 11*c* of the cooling device 11 are both accommodated on the rear side relative to the first cross member 1. Note that, in a case where the vehicle body structure 100 accommodates the battery portion 10*a* on the front side relative to the first cross member 1, the vehicle body structure 100 also accommodates the blower portion 11*c* on the front side relative to the first cross member 1. This is because the battery portion 10*a* can be easily connected to the blower portion 11*c* by use of the second duct portion 11*d*. Note that the vehicle body structure 100 may accommodate the intake portion 11*a*, the first duct portion 11*b*, and the blower portion 11*c* of the cooling device 11 in the same one space (e.g., the space SP1L).

Note that, in the present embodiment, a height of the battery portion 10*a* is higher than a height of the controlling portion 10*c* and further higher than respective heights of the first cross member 1 and the second cross member 2. Accordingly, the power storage device 10 is configured such that the battery portion 10*a* and the controlling portion 10*c* are accommodated separately in two spaces adjacent to each other across the first cross member 1, so that a height of the space in which to accommodate the power storage device 10 is restrained, thereby promoting a low floor.

However, the present invention is not limited to this configuration. For example, in a case where a total height of the battery portion 10*a* and the controlling portion 10*c* at the time when they are laminated is lower than respective heights of the first cross member 1 and the second cross member 2, the vehicle body structure 100 may accommodate the controlling portion 10*c* so as to be placed on an upper side or a lower side of the battery portion 10*a*. Even if the battery portion 10*a* and the controlling portion 10*c* are put on top of one another, this does not obstruct a low floor. In this case, the power storage device 10 may be configured such that the battery portion 10*a* and the controlling portion 10*c* are integrated with each other. Note that, even in a case where the total height of the battery portion 10*a* and the controlling portion 10*c* is lower than respective heights of the first cross member 1 and the second cross member 2, the vehicle body structure 100 may separate the battery portion 10*a* and the controlling portion 10*c* and accommodate the controlling portion 10*c* in an adjacent space across the first cross member 1.

Further, the vehicle body structure 100 may accommodate the battery portion 10*a*, the connection portion 10*b*, and the controlling portion 10*c*, which are placed in line, in the same one space (e.g., the space SP1R).

Further, the power storage device 10 may divide the battery portion 10*a* into two or more parts, so as to restrain a height of the battery portion 10*a*, thereby further promoting a low floor. In this case, the two or more battery portions 10*a* may be collectively accommodated in the same one space (e.g., the space SP1R) or may be accommodated in a plurality of spaces dispersedly.

Figure 5:
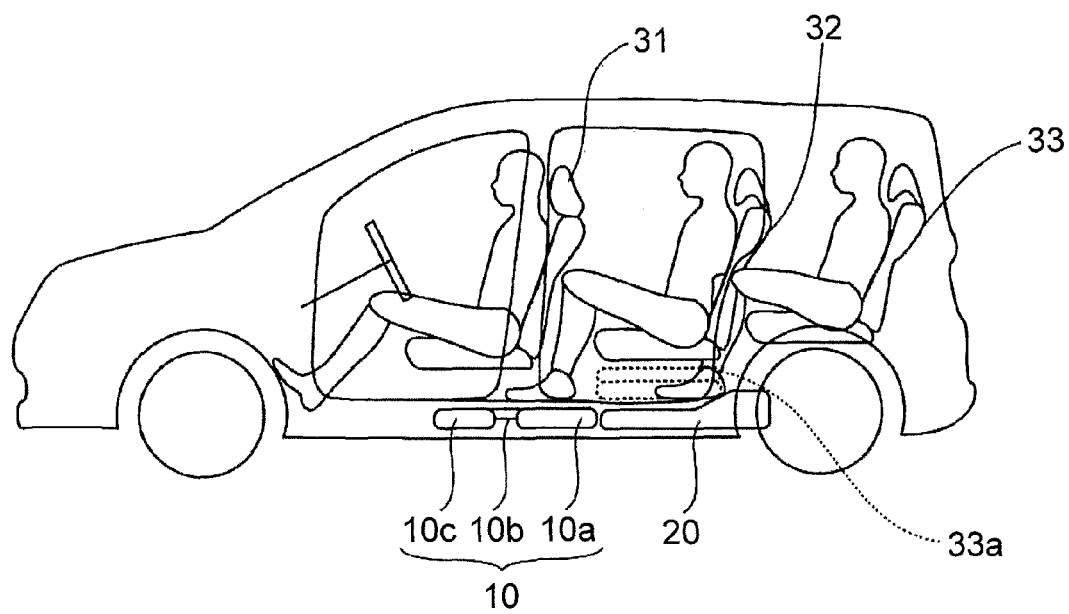
FIG. 5 is a transparent side view of a vehicle including a vehicle body structure of FIG. 1 and three rows of seats.

Referring now to FIG. 5, one example of a positional relationship of a seat with the power storage device 10 and the cooling device 11 will be described. Note that FIG. 5 is a transparent side view of a vehicle including three rows of seats.

As illustrated in FIG. 5, the power storage device 10 is accommodated in that part of the passenger-compartment outer space under the floor carpet which corresponds to an interval from a center of a seating face of a first-row seat 31 to a front end of a seating face of a second-row seat 32 in the vehicle front-rear direction. Note that the passenger-compartment outer space under the floor carpet exists between the floor carpet and the floor panel 4 in the vertical direction. More specifically, the battery portion 10*a* is accommodated in that part of the passenger-compartment outer space under the floor carpet which corresponds to an interval from a rear end of the seating face of the first-row seat 31 to the front end of the seating face of the second-row seat 32 in the vehicle front-rear direction, and the connection portion 10*b* and the controlling portion 10*c* are accommodated in that part of the passenger-compartment outer space under the floor carpet which corresponds to an interval from the center of the seating face of the first-row seat 31 to the rear end of the seating face of the first-row seat 31 in the vehicle front-rear direction. Further, a fuel tank 20 is accommodated in that part of the passenger-compartment outer space under the floor carpet which is on a rear side relative to the power storage device 10.

With the above configuration, the vehicle body structure 100 can form the passenger-compartment outer space in which to accommodate the power storage device 10 by use of the first cross member 1, the second cross member 2, the third cross member 3, the left rocker panel 5L, the right rocker panel 5R, and the like, which have been already provided as part of the framework of the vehicle. On that account, it is not necessary for the vehicle body structure 100 to additionally separately have a member for holding or fixing the power storage device 10.

Further, the vehicle body structure 100 is configured such that the power storage device 10 is accommodated in that part of the passenger-compartment outer space which is placed on either side of the swelling portion 4*a* extending in the vehicle front-rear direction along the vehicle central axis C. On that account, the vehicle body structure 100 can provide a symmetric accommodation space, and can accommodate the power storage device 10 without causing any adverse effect on collision performance in all directions.

Further, the vehicle body structure 100 is configured such that the power storage device 10 is accommodated in the space between two cross members, thereby preventing the cross members from being provided on the power storage device 10. This accordingly makes it possible to improve workability of replacement of the power storage device 10. More specifically, the vehicle body structure 100 is configured such that the power storage device 10 can be replaced by removing right one of the first-row seat 31.

Further, the vehicle body structure 100 accommodates the power storage device 10 in the passenger-compartment outer space having about the same height as a top of the swelling portion 4*a* of the floor panel 4. On that account, it is possible to achieve a flat and low floor in the passenger compartment.

Further, the vehicle body structure 100 accommodates the power storage device 10 and the fuel tank, which are heavy, in a vehicle central part. This promotes a low center of gravity of the vehicle and makes it possible to improve stable steering of the vehicle.

Further, the vehicle body structure 100 accommodates the power storage device 10 in a space that has been a dead space conventionally. Accordingly, it is possible to enlarge a space in the passenger compartment, thereby making it possible to attain various seat arrangements and to secure a sufficient compartment capacity. Note that the seat arrangement includes addition of a tip-up function, addition of a slide function, storing of a third-row seat 33 under the second-row seat 32 (see a seat 33*a* stored as indicated by a broken line in FIG. 5), and the like.

Further, the vehicle body structure 100 accommodates the battery portion 10*a* at a position away from the catalytic converter 7. More specifically, the battery portion 10*a* is accommodated so that a distance between the catalytic converter 7 and the battery portion 10*a* is larger than a distance between the catalytic converter 7 and the controlling portion 10*c*. Accordingly, it is possible to restrain an adverse effect due to heat with respect to the life or the like of the battery portion 10*a*. Similarly, the vehicle body structure 100 accommodates the battery portion 10*a* at a position away from an engine compartment in which to accommodate heat sources such as an engine, a motor generator for running and a power control unit. Accordingly, it is possible to restrain an adverse effect due to heat with respect to the life or the like of the battery portion 10*a*.

Further, the vehicle body structure 100 is configured such that the power storage device 10 and the cooling device 11 are accommodated in a dispersed manner in respective spaces on both sides of the swelling portion 4*a* extending in the vehicle front-rear direction along the vehicle central axis C. On this account, it is possible to increase a cooling effect of the power storage device 10 while realizing a low floor of the passenger compartment.

Figure 6:
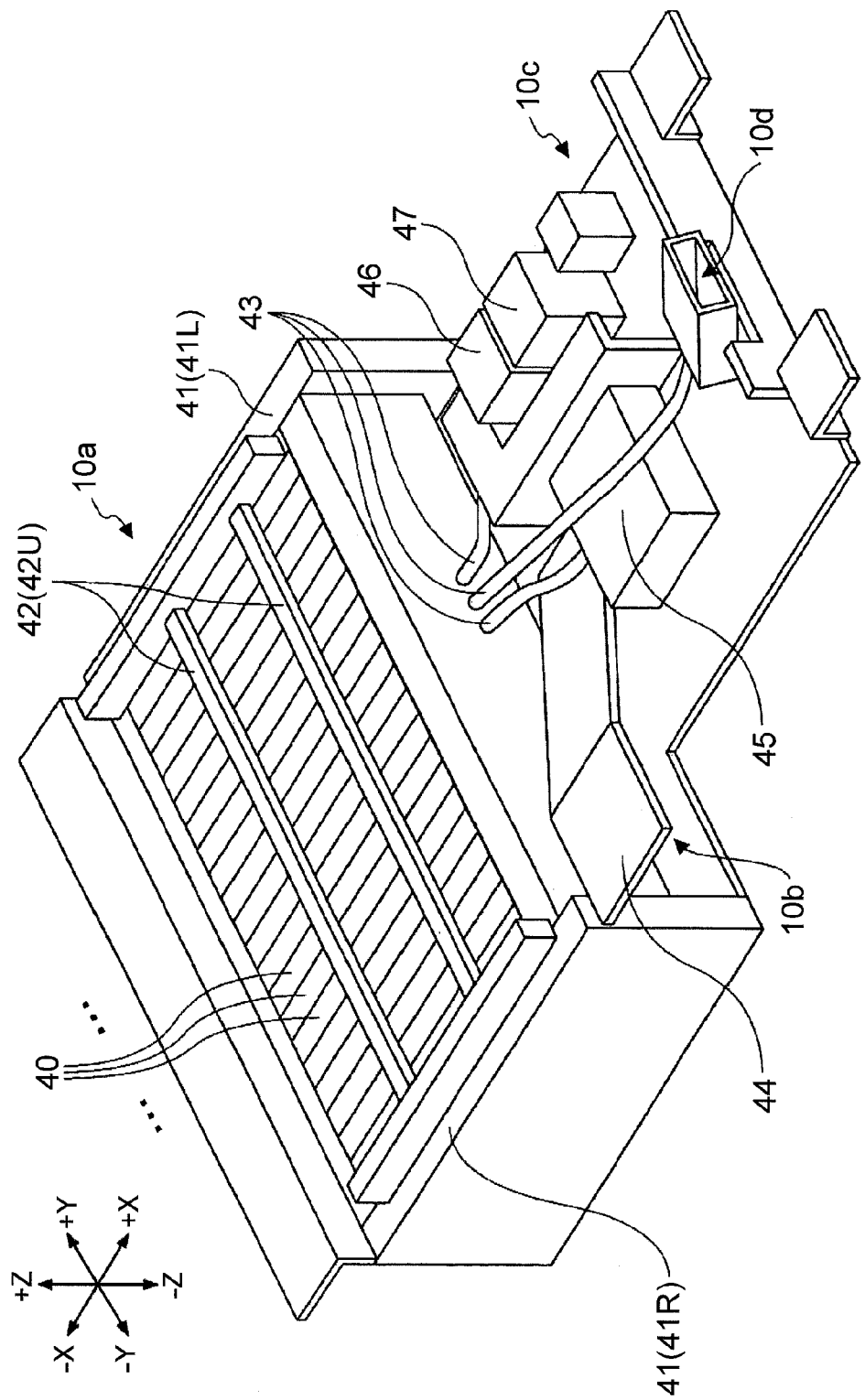
FIG. 6 is a perspective view of a power storage device to be accommodated in the vehicle body structure of FIG. 1, when viewed from a diagonally upper side.
Figure 7:
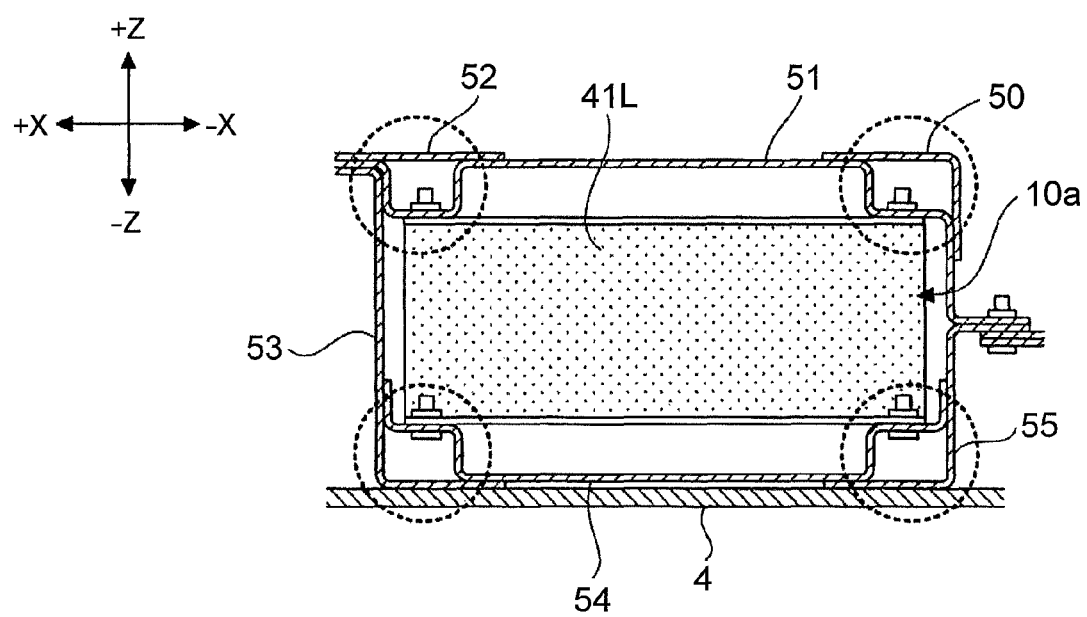
FIG. 7 is a partial sectional view of a battery portion of the power storage device of FIG. 6, when viewed from a left side.

Referring now to FIGS. 6 and 7, details of the power storage device 10 to be accommodated in the vehicle body structure 100 will be described below. FIG. 6 is a perspective view of the power storage device 10 when viewed from a diagonally upper side, and FIG. 7 is a partial sectional view of the battery portion 10*a* when viewed from a left side. Note that FIG. 6 does not illustrate the case of the controlling portion 10*c* so as to clearly illustrate the inside of the controlling portion 10*c*. Further, FIG. 6 illustrates a service plug 10*e* opening of the high-voltage blocking portion 10*d*, but does not illustrate a service plug 10*e*.

As illustrated in FIG. 6, the battery portion 10*a* of the power storage device 10 includes battery stacks 40, an end plate 41, and a rod 42.

The battery stacks 40 are laminated in the vehicle width direction so as to increase an offset yield strength (strength) to a force (a collision load) from the vehicle width direction.

The end plate 41 is a reinforcing member placed on either side of the battery stacks 40 thus laminated in the vehicle width direction, and functions to increase the strength with respect to the collision load from the vehicle width direction. Further, the end plate 41 includes a left end plate 41L and a right end plate 41R.

The rod 42 is a member for connecting the left end plate 41L to the right end plate 41R, and functions to increase the strength with respect to the collision load from the vehicle width direction. In the present embodiment, the rod 42 includes two upper rods 42U placed on an upper side relative to the battery portion 10*a*, and two lower rods 42D (not shown) placed on a lower side relative to the battery portion 10*a*.

As such, the end plate 41 and the rod 42 constitute a battery pack case in which to accommodate the battery stacks 40.

Further, as illustrated in FIG. 7, the battery portion 10*a* is fixed to the first cross member 1 and the second cross member 2 by use of fixing plates 50 to 55. The fixing plates 50 to 55 are each constituted by a plate material extending in the vehicle width direction. The fixing plates 50 to 55 are connected to each other by welding or the like, so as to form a closed section by four corners of the battery portion 10*a* as indicated by four broken-line circles. The four corners of the battery portion 10*a* are a front upper corner, a front lower corner, a rear upper corner, and a rear lower corner.

With this configuration, the fixing plates 50 to 55 can increase the strength with respect to not only a collision load from the vehicle width direction, but also a collision load from the vehicle front-rear direction.

As illustrated in FIG. 6, the connection portion 10b of the power storage device 10 includes a wire harness 43 for electrically connecting the battery portion 10a to the controlling portion 10c, and a structure 44 for structurally connecting the battery pack case of the battery portion 10a to the case of the controlling portion 10c. Note that the wire harness 43 includes a cable for electrically connecting the battery portion 10a to the high-voltage blocking portion 10d. Further, the structure 44 of the connection portion 10b is fixed to the first cross member 1 by use of a fastening member such as a bolt.

As illustrated in FIG. 6, the controlling portion 10c of the power storage device 10 includes a monitoring unit 45, a junction block 46, and a system main relay 47.

The monitoring unit 45 is a device for monitoring a storage state of the battery portion 10a. The junction block 46 is a protection box in which to accommodate terminals and the like used for connecting, branching, and relaying of a power line from an in-vehicle electric load and a power line from the battery portion 10a. The system main relay 47 is a device for performing a switching control on the connecting, branching, relaying, and the like of the power lines.

Further, a front end and a rear end of the case of the controlling portion 10c are each fixed to the first cross member 1 and the third cross member 3 by use of fixing plates (not shown).

With the above configuration, the power storage device 10 has a structure that is hard to be deformed or damaged even in a case of a side collision. This accordingly makes it possible to increase collision safety of the vehicle.

Further, the power storage device 10 connects the battery portion 10a and the controlling portion 10c via the connection portion 10b that is easily deformed as compared with the battery portion 10a. Accordingly, the power storage device 10 can absorb, by deformation of the connection portion 10b, a force to act on the battery portion 10a through deformation of the vehicle body at the time of a collision. As a result, the power storage device 10 can restrain deformation and damage of the battery portion 10a at the time of a collision.

Further, the battery portion 10a is fixed to the first cross member 1 and the second cross member 2 by use of the fixing plates 50 to 55. On that account, the battery portion 10a can easily secure attachment strength.

Further, the battery portion 10a accommodates the battery stacks 40 in the battery pack case constituted by the end plate 41 and the rod 42. The battery pack case is fixed to the first cross member 1 and the second cross member 2 via the closed section formed of the fixing plates 50 to 55. This accordingly allows the battery portion 10a to secure sufficient load resistance strength in an up-down direction to support the weight of an occupant.

Further, the battery portion 10a is configured to include the end plate 41 and the rod 42 so as to have strength superior to that of the swelling portion 4a of the floor panel 4. Accordingly, when the battery portion 10a makes contact with the swelling portion 4a due to a side collision or the like, the swelling portion 4a is crushed by the battery portion 10a, thereby making it possible to absorb an impact energy. As a result, the swelling portion 4a can restrain deformation and damage of the battery portion 10a.

The preferred embodiment of the present invention has been described above in detail. However, the present invention is not limited to the above embodiment, and various modification and substitution can be added to the above embodiment without departing from the scope of the present invention.

For example, in the above embodiment, the connection portion 10b of the power storage device 10 and the first duct portion 11b of the cooling device 11 are placed over the first cross member 1. However, the present invention is not limited to this configuration. For example, in a case where a gap is provided between the first cross member 1 and the floor panel 4, the connection portion 10b and the first duct portion 11b may be placed below the first cross member 1.

Further, in the above embodiment, the vehicle body structure 100 accommodates therein the air-cooling cooling device 11 including the blower portion 11c, but may accommodate therein cooling devices of other types, such as a liquid-cooling cooling device including a hydraulic pump or the like.

DESCRIPTION OF THE REFERENCE NUMERALS

1 FIRST CROSS MEMBER
2 SECOND CROSS MEMBER
3 THIRD CROSS MEMBER
4 FLOOR PANEL
4a SWELLING PORTION
5 LONGITUDINAL FRAME MEMBER
5L LEFT ROCKER PANEL
5R RIGHT ROCKER PANEL
6 EXHAUST PIPE
7 CATALYTIC CONVERTER
10 POWER STORAGE DEVICE
10a BATTERY PORTION
10b CONNECTION PORTION
10c CONTROLLING PORTION
10d HIGH-VOLTAGE BLOCKING PORTION
11 COOLING DEVICE
11a INTAKE PORTION
11b FIRST DUCT PORTION
11b1 PARTITION WALL
11b2 SOUND ABSORBING MATERIAL
11c BLOWER PORTION
11d SECOND DUCT PORTION
31 FIRST-ROW SEAT
32 SECOND-ROW SEAT
33 THIRD-ROW Seat
40 BATTERY STACK
41 END PLATE
41L LEFT END PLATE
41R RIGHT END PLATE
42 ROD
42U UPPER ROD
43 WIRE HARNESS
44 STRUCTURE
45 MONITORING UNIT
46 JUNCTION BLOCK
47 SYSTEM MAIN RELAY
50 to 55 FIXING PLATE
100 VEHICLE BODY STRUCTURE

The invention claimed is:
1. A vehicle body structure comprising:
a first panel member and a second panel member configured to form part of a framework of a vehicle extending in a vehicle front-rear direction;
a first frame member and a second frame member configured to form part of the framework of the vehicle and extending in a vehicle width direction between the first and second panel members;

a power storage device including a battery portion and a controlling portion, an entire part of the battery portion being accommodated in a space between a floor in a passenger compartment and a floor panel and between the first frame member and the second frame member, wherein the floor panel includes a first floor panel portion, a second floor panel portion, and a swelling portion that extends in the vehicle front-rear direction along a vehicle central axis, the first floor panel portion extending beneath the battery portion and the controlling portion from the first panel member to the swelling portion, the second floor panel portion extending from the second panel member to the swelling portion, the swelling portion protruding from the first and second floor panel portions toward the floor, the battery portion and the controlling portion are accommodated entirely on opposite sides of the first frame member, the entire controlling portion is disposed closer than an upper surface of the swelling portion to the first floor panel portion, the battery portion and the controlling portion are accommodated entirely on one side of the swelling portion, and a cooling device configured to cool down the power storage device is accommodated on the other side of the swelling portion, the second floor panel portion extending beneath the cooling device.

2. The vehicle body structure according to claim 1, wherein
at least part of the cooling device is accommodated in the space between the first frame member and the second frame member.

3. The vehicle body structure according to claim 1, further comprising
a catalytic converter, wherein the battery portion is accommodated such that a distance between the catalytic converter and the battery portion is larger than a distance between the catalytic converter and the controlling portion.

4. The vehicle body structure according to claim 1, further comprising
a third frame member configured to form part of the framework of the vehicle and extending in the vehicle width direction, wherein
an entire part of the controlling portion is accommodated in a space between the first frame member and the third frame member.

5. The vehicle body structure according to claim 4, wherein
a service plug is provided on the third frame member.

6. The vehicle body structure according to claim 4, wherein
the first frame member is placed on a front side relative to the second frame member in the vehicle front-rear direction, and
the third frame member is placed on a front side relative to the first frame member in the vehicle front-rear direction.

7. The vehicle body structure according to claim 1, wherein
the first floor panel portion and the second floor panel portion are formed integrally with the swelling portion, and
the swelling portion is open in a direction away from the floor so as to form a floor tunnel.

8. The vehicle body structure according to claim 7, further comprising
an exhaust pipe accommodated in the floor tunnel formed by the swelling portion.

* * * * *